United States Patent [19]

Rabe et al.

[11] 4,228,638
[45] Oct. 21, 1980

[54] PRESERVATIVE APPLICATOR FOR A ROUND BALER

[75] Inventors: David L. Rabe, Ottumwa, Iowa; Colin M. Hudson, Moline, Ill.; Gust Soteropulos, Ottumwa, Iowa

[73] Assignee: Deere & Company, Moline, Ill.

[21] Appl. No.: 955,021

[22] Filed: Oct. 26, 1978

[51] Int. Cl.³ .................... A01D 39/00; A01D 75/00
[52] U.S. Cl. ........................................ 56/341; 100/74; 100/88
[58] Field of Search ................ 100/74, 88, 89; 56/341

[56] References Cited

U.S. PATENT DOCUMENTS

| | | | |
|---|---|---|---|
| 2,571,489 | 10/1951 | Russell | 56/341 |
| 3,280,543 | 10/1966 | Lawrence et al. | 56/1 |
| 3,834,141 | 9/1974 | Bracht et al. | 56/341 |
| 3,837,159 | 9/1974 | Vermeer | 56/341 |
| 3,996,848 | 12/1976 | Molitorisz | 100/73 |
| 4,010,857 | 3/1977 | Reim et al. | 100/74 |
| 4,065,914 | 1/1978 | Phillips et al. | 56/341 |

OTHER PUBLICATIONS

"Grain and Forage Harvesting", ASAE Publication 1-78, pp. 303-307, Advances With Chemical Preservatives, Klinner & Holden, published 5-78.

Primary Examiner—Paul J. Hirsch

[57] ABSTRACT

A round baler has a conventional pickup and an approximately horizontal, wide, lower conveyor for removing hay from a field and delivering it rearwardly in a transversely extending mat to a transversely extending bale chamber where it is rolled into a cylindrical bale. The upper run of the lower conveyor is approximately tangential to the lower side of the forming bale so that there is a "pinch point" where the incoming mat of crop material converges on the periphery of the forming bale. A series of fluid dispensing nozzles spaced across the machine connected to a source of preservative carried on the baler is disposed so that preservative may be applied to the hay close to the pinch point across the lateral extent of the bale chamber. The incoming mat may vary in width and in lateral disposition relative to the baler conveyor system and sensors spaced across the machine and used to detect the presence or absence of hay and control fluid valves in the nozzle lines so that preservative is released only adjacent those portions of the bale where hay is being added. In a preferred embodiment, the nozzles are carried above the incoming mat and direct preservative downwardly and rearwardly adjacent the pinch point and the hay sensors are associated with compressor rods associated with the pickup assembly.

31 Claims, 8 Drawing Figures

PRESERVATIVE APPLICATOR FOR A ROUND BALER

BACKGROUND OF THE INVENTION

The present invention relates to machines for forming cylindrical bales of crop material, such as hay, and particularly to an improved means of applying a fluid preservative, such as liquid ammonia, to the crop material as the bale is being formed.

The potential benefits of applying preservatives to hay either during a baling process or to the finished bale are well known and include (a) permitting the hay to be baled and stored at higher moisture contents without spoilage, thus reducing field losses and making the hay making operation less dependent on favorable weather conditions; (b) improved palatability and digestibility; and (c) higher nutrient content. The relative importance of these benefits varies with the crop being treated and the preservative used.

However, for best results and acceptable cost, the preservative must be uniformly distributed through the crop material and applied with a minimum of wastage. The method of localized injection of preservative into finished bales is known to be inadequate but some success has been achieved with conventional rectangular balers having apparatus for injecting a fluid preservative into the mass of hay as it is being compacted in the baling chamber.

It is also known to spray the windrow immediately ahead of the pickup of both rectangular and big round balers. But when a fixed spray pattern width is used with a typical windrow varying in both width and thickness, there will clearly be wastage (when for example the windrow width is narrow) and an effective variation in rate of application due to variation in windrow thickness. And, of course, apart from the direct loss of fluid failing to contact the crop material, in the case of a volatile fluid such as liquid ammonia, there will be additional losses to the atmosphere through vaporization both before the ammonia reaches the crop material and from the crop material surfaces while it is still enroute to the baling chamber. With a fluid such as ammonia, such losses are not only costly but may be offensive to an operator.

SUMMARY OF THE INVENTION

Accordingly, an object of the present invention is to provide an apparatus for applying a fluid preservative uniformly and efficiently and at a controlled rate to crop material in a round baler after its engagement by the conveying system of the baler and shortly before or soon after the material is incorporated into a bale.

It is a feature of the invention that control of application of the fluid is automatic and responsive to variations in width and lateral disposition of a mat of crop material being conveyed to a baling chamber on the machine so that substantially all fluid released by the apparatus contacts a portion of the crop material mat. A series of laterally spaced fluid dispensing nozzles may each be associated with one of a series of sensors or detectors spaced across the baler and disposed so as to detect the presence of crop material at laterally spaced points in the conveying system and, through a suitable transducer, effect the release of fluid preservative from a nozzle preferably longitudinally aligned with that sensor.

It is a feature of the invention that preservative may be applied to the crop material close to the "pinch point" at which the incoming material joins the rotating and forming cylindrical bale. A laterally extending fluid dispensing apparatus may be disposed adjacent such a point so that losses to the atmosphere through vaporization are minimized because, upon its release, the fluid is substantially surrounded by damp and moving crop material included in the periphery of the forming bale, and the incoming mat, the latter soon being enclosed in the forming bale so that the crop material surfaces on which the preservative is still in the process of reacting become shielded from the atmosphere. Volatile material, such as ammonia, then diffuses through the hay in the bale. At least some of the preservative released near the pinch point may be deposited directly on a portion of the bale periphery exposed there.

In keeping with the invention, preservative may be applied from either side of an incoming mat and the application system may include sensors close to or integral with dispensing nozzle assemblies, or sensors may be longitudinally spaced from their associated dispensing nozzle assemblies.

DESCRIPTION OF THE PREFERRED EMBODIMENT

Figure 1:
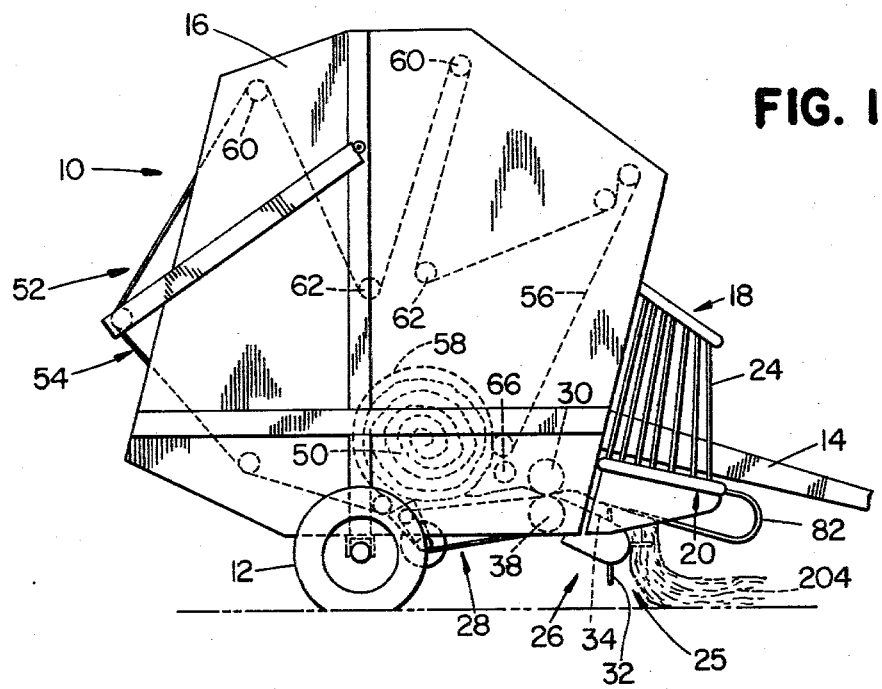
FIG. 1 is a somewhat schematic right side elevation of a large round baler embodying the invention.

The invention is embodied in a baler of the type where a large cylindrical bale is formed off the ground and discharged rearwardly after the bale is fully formed. A machine of this general type is described in detail in U.S. Pat. No. 3,931,702 which has an assignee common to the present invention and only a summary of the description of the conventional parts of the embodiments is given here. The machine includes a mobile main frame indicated generally by the numeral 10 mounted on a pair of wheels 12 at opposite sides of the frame. An implement tongue 14 extends forward from the frame for connecting to a pulling vehicle in the conventional manner. The frame also includes a pair of upright fore-and-aft side panels or walls 16 that form the opposite sides of a baling zone or chamber.

Mounted on the frame at the front of the machine and straddling the tongue 14 is a safety guard assembly 18 which includes a lower generally horizontal tubular member 20 having a transverse forward portion 22 and a plurality of upright rails 24.

A crop conveying system 25 is carried by the lower forward part of the main frame 10, extending transversely between the opposite side sheets 16 and including a forward pickup mechanism 26 disposed beneath the safety guard assembly 18, a bottom conveyor 28 and an upper compression roll 30.

The pickup is generally conventional and includes a plurality of tines 32 and an upwardly and rearwardly inclined stripper floor 34.

The bottom conveyor 28 includes a plurality of side-by-side endless belts 36 trained around a forward roller 38 and a rear roller 40, tension in the belts 36 being maintained by an idler roller 42 carried on an idler arm 44 and biased by an idler spring 46. A plurality of disk-like guides 48 carried on the idler roller 42 space and guide the belts 36.

The baling zone or chamber extending between the opposite side sheets 16 is indicated generally by the numeral 50. The chamber 50 is defined by a bale-forming mechanism indicated by the numeral 52 and including a bale-forming conveyor 54. The conveyor 54 includes a plurality of side-by-side belts 56 including a bale-engaging run 58 which initially spans the inlet of the baling chamber and is shown in FIG. 1 partially wrapping a partially formed bale. The belts 56 are trained around a plurality of fixed rollers 60 extending transversely between the side sheets 16 and a pair of idler rollers 62 which are supported on a biased belt take-up arm (not shown) which is free to deflect upwards to provide the increase in length of the bale-engaging run 58 required as the bale grows in the baling chamber.

The upper compression roll 30 is supported between the opposite side sheets above and closely adjacent to the forward roller 38 of the bottom conveyor 28, the two rollers cooperating to form a pair of compression rolls. An elongated stripper assembly 64, seen best in FIG. 2, supported by the frame 10 and extending transversely between the side sheets 16 is set close to the rearward side of the compression roll 30 to prevent build up of extraneous material on that roll. A transverse stripper roller 66 extends between the opposite side sheets 16 immediately to the rear of the upper compression roller 30 and immediately below the lower front fixed roller 60 to strip crop material from the bale-forming conveyor belts 56 at the forward end of the baling chamber 50, the stripper roller 66 being driven in a counterclockwise direction as viewed in FIG. 1.

Figure 3:
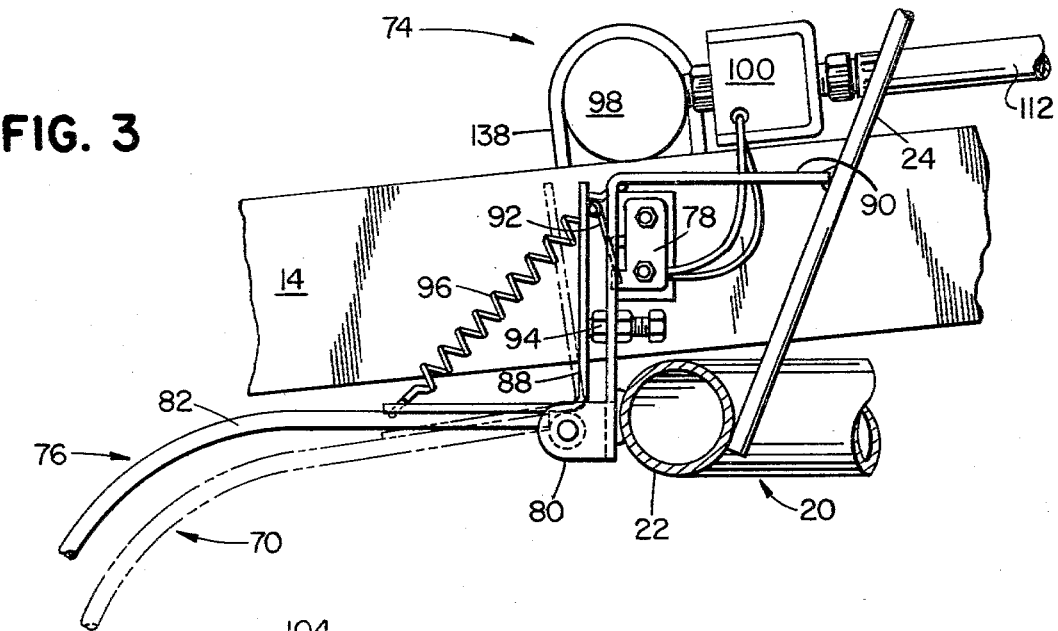
FIG. 3 is an enlarged partial side elevation approximately on line 3—3 of FIG. 4 showing the control system and part of the sensor assembly for an alternative embodiment of an electrically controlled dispensing system.
Figure 4:
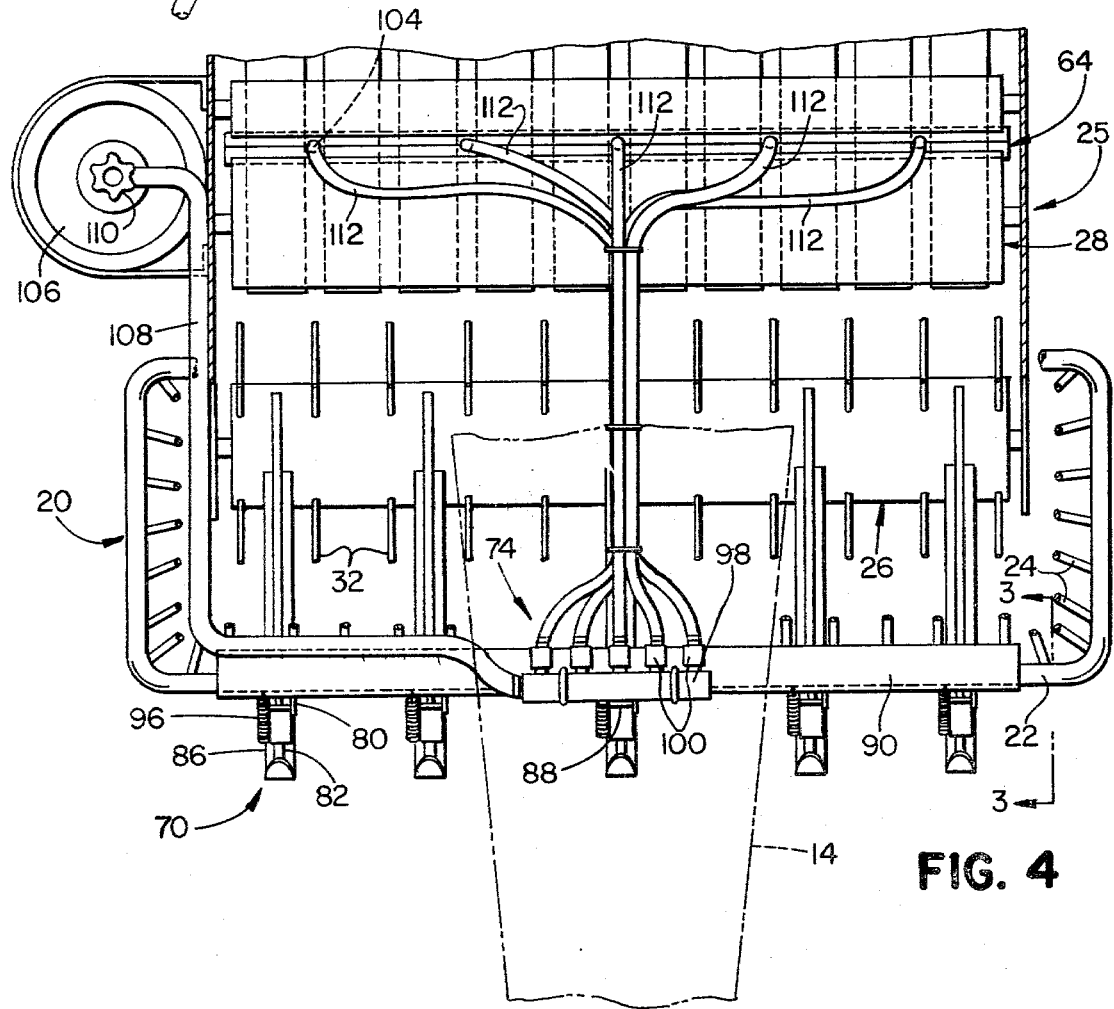
FIG. 4 is an overhead, partial view of the baler with some components omitted showing the general arrangement of the embodiment of FIG. 3.
Figure 6:
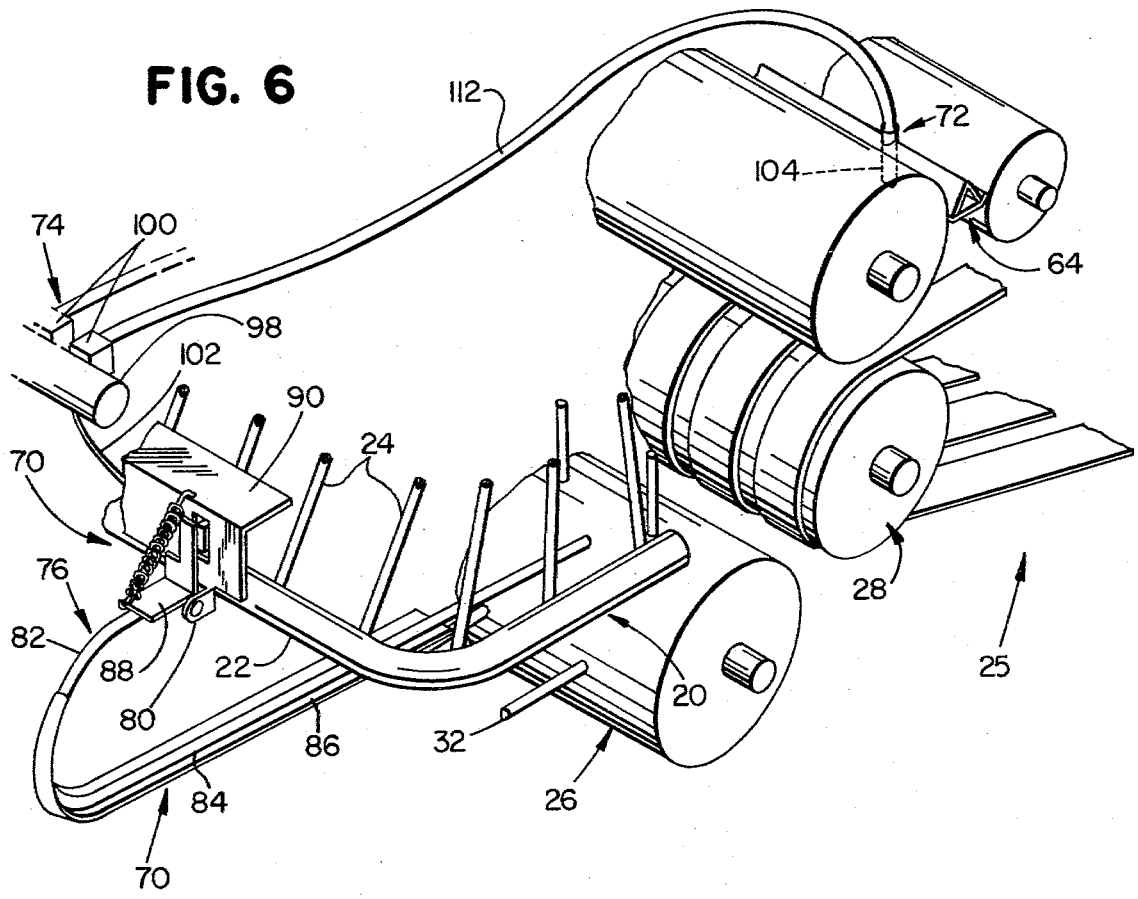
FIG. 6 is a three-quarter, left-hand, front schematic perspective showing the general disposition of the sensing, control and dispensing portions of the embodiment of FIG. 3 in relation to elements of the conveying system of the baler.

A preferred embodiment of an apparatus for applying a crop treating and preserving fluid such as liquid ammonia to the crop material being baled is best seen in FIGS. 3, 4 and 6 and includes a series of associated, laterally spaced detector or sensor units 70 adjacent the pickup 26, a dispenser assembly 72 integral with the compression roller stripper 64 and, as part of a control system, a solenoid bank 74 mounted on the tongue 14. Sensing or detection of the presence of crop material engaged by the pickup 26 at a given location and being conveyed generally upwardly and rearwardly is effected by a compression rod assembly 76 cooperating with a normally closed microswitch 78 and forming part of each sensor unit 70. Each compression rod assembly 76 is supported for pivoting about a transverse axis by a pivot bracket 80 mounted on the transverse portion 22 of the lower member 20 of the safety guard assembly 18. The rod assembly includes a compression rod 82 having a generally fore-and-aft extending lower portion 84 (seen best in FIG. 6) carrying a pressure plate 86 on its lower side and towards its rearward free end. A striker arm 88 extends upwards from the compression rod 82 immediately above the pivot bracket 80. Also attached to the lower forward portion 22 of the safety guard assembly 18 is a switch bracket 90 supporting the normally closed microswitches 78, the actuators 92 of which are engageable by the strikers 88. Adjustable stops 94 also carried by the switch bracket 90 engage each striker 88 somewhat below the microswitch 78. A helical coil tension spring 96 is stretched between the upper side of each compression rod 82 and the switch bracket 90 so as to bias the compression rod in a clockwise direction with respect to the pivot bracket 80 so that the striker 88 engages the stop 94 and the microswitch actuator 92, depressing the actuator so that in this condition the switch is open.

The solenoid bank 74 mounted on the tongue 14 above the sensor unit 70 includes a transversely extending manifold 98 carrying and fluidly communicating with a series of conventional electric solenoid valves 100, each valve being electrically connected to a microswitch 78 by wires 102. The solenoids are powered by an electrical power source on the towing vehicle (not shown).

The dispenser assembly 72 comprises a series of nozzles 104 carried by the compression roll stripper or scraper 64 and arranged so that they discharge fluid downwards immediately rearward of the compression roll 30. The nozzles 104 being supported by the compression roll stripper 64 extend in a transverse row or bank across the machine essentially spanning the conveying system and are evenly spaced in relation to the conveying system 25, the number of nozzles 104 being equal to the number of sensor units 70 with each nozzle 104 being in approximate longitudinal alignment with the sensor unit 70 (best seen in FIG. 4) by which it is controlled through one of the solenoid valves 100. Crop preserving fluid is carried on the machine in a storage tank 106 indicated in FIG. 4. A suitable hose 108 connects the tank 106 to the manifold 98 of the solenoid bank 74 and flow from the tank 106 to the manifold 98 is controlled by a shut-off valve 110 at the tank. A series of hoses 112 conduct fluid from the solenoid valves 100 (when open) to their associated nozzles 104.

Figure 2:
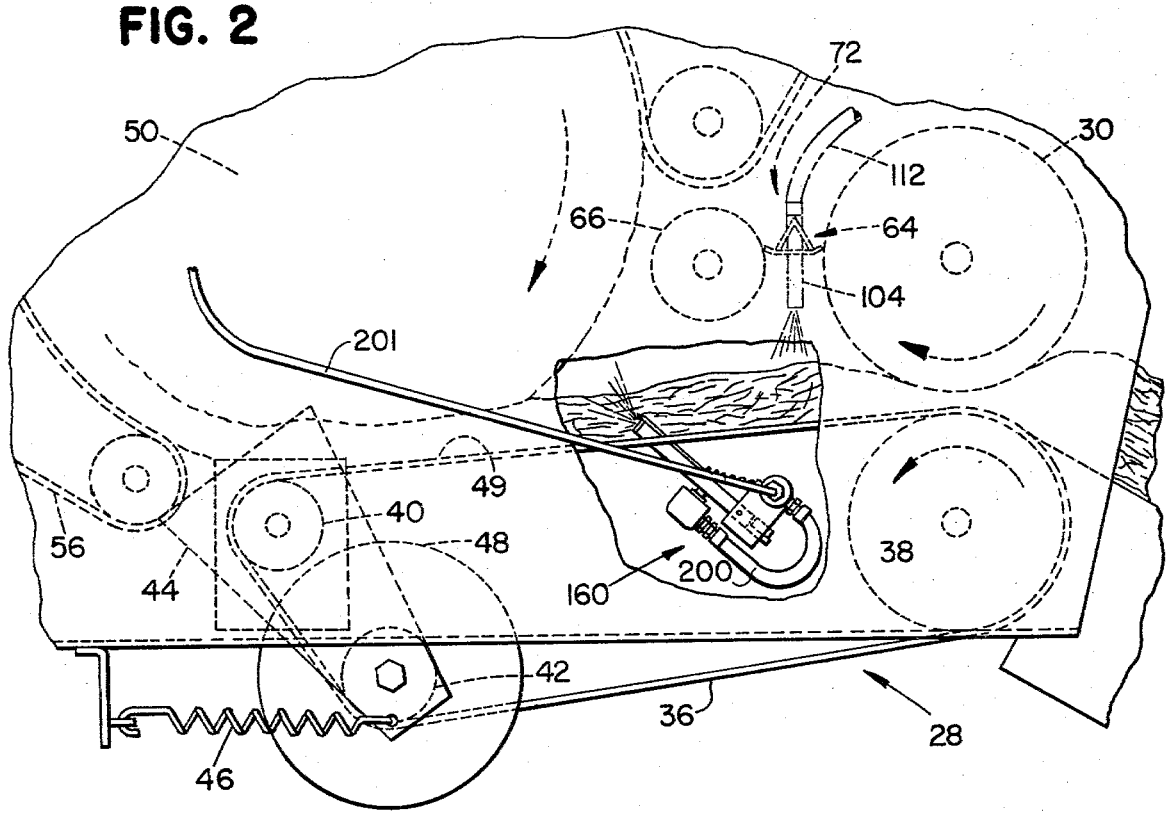
FIG. 2 is an enlarged, partial, schematic side elevation of the bottom conveyor portion and baling zone of the baler showing an electrically controlled fluid dispensing apparatus extending between the belts of that conveyor.
Figure 5:
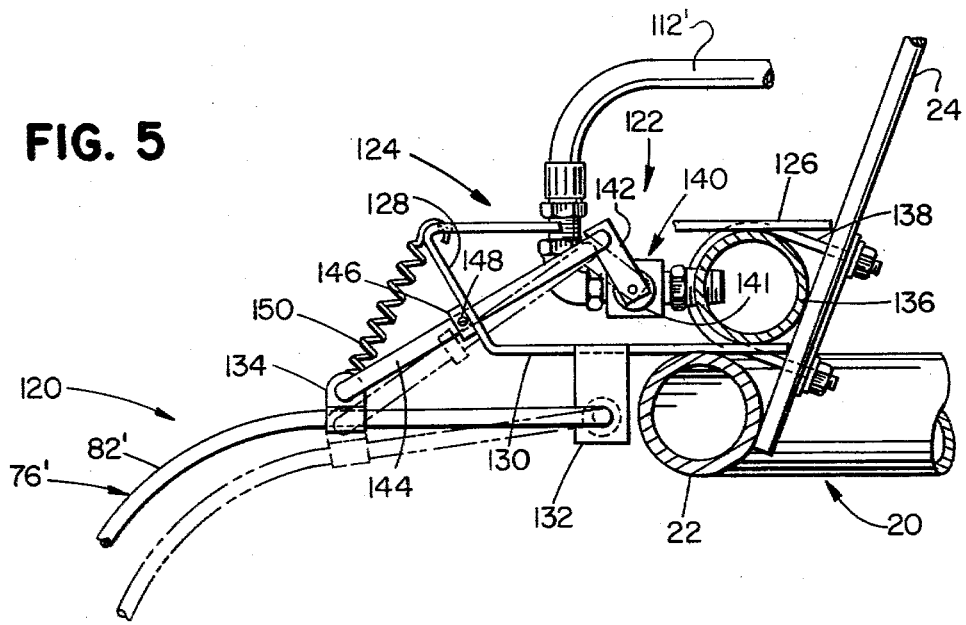
FIG. 5 is an enlarged partial side elevation similar to FIG. 3 of the control system and part of the sensor assembly of a mechanically controlled embodiment of the invention.

FIG. 5 illustrates an alternative embodiment of a preserving fluid application system similar to that shown in FIGS. 3, 4 and 6 using mechanical rather than electrical transducing of the detector or sensor signal for controlling the delivery and dispensing of fluid to a dispenser assembly similar to that described above and indicated by the numeral 72 in FIG. 2. In this embodiment a series of laterally spaced sensor units 120 and a control valve assembly 122 are mounted on the lower forward portion of the safety guard assembly 18 by a series of mounting brackets 124, each having an approximately horizontal top portion 126 and an upright front portion 128 and an approximately horizontal bottom portion 130. Depending from each bottom portion 130 is a pivot bracket 132 supporting for pivoting about a transverse axis, a compressor rod assembly 76' similar to that described above and shown in FIGS. 3, 4 and 6. Each compressor rod assembly 76' includes somewhat forward of the pivot bracket 132 an upwardly extending lug 134. The control valve assembly 122 includes a manifold pipe 136 (shown only in cross sectional view in FIG. 5) extending across the conveyor assembly and attached to the forward side of the uprights 24 by clamps 138. Supported by and extending forward from the manifold pipe 136 are a series of laterally spaced conventional ball valves 140, each having a rotatable orifice element 141, each in fluid communication with the manifold pipe 136 and each disposed above and adjacent one of the sensor units 120 and including an actuating lever 142 connected to the orifice element 141, the valves being mounted so that the actuating lever 142 moves in an approximately vertical fore-and-aft plane to control the opening and closing of the valve. Pivotally connected between the outer end of each valve actuating lever 142 and each compression rod lug 134 is a control link 144 passing through a slot in the upright portion 128 of the mounting bracket 124 and carrying, threaded on the link, an adjustable stop collar 146 secured to the control link by a set screw 148. A helical tension spring 150 is connected between each lug 134 and a forward upper corner of each associated mounting bracket 124 for urging sensor unit 120 clockwise, as viewed in FIG. 5, so as to urge stop collar 146 of the control link 144 against the upright portion 128 of the bracket 124. Crop preserving fluid is supplied to the manifold pipe 136 in a manner similar to that described above and fluid is conducted between the valves 140 and the dispenser nozzles by hoses 112'. As in the previously described embodiment, sensor units 120 and dispenser nozzles, such as those indicated by the numeral 104 in FIG. 2, are spaced evenly across the conveying system 25 of the baler, each sensor unit 120 controlling a single dispenser nozzle and sensors and nozzles being in approximate longitudinal alignment.

In another embodiment illustrated in FIGS. 2, 7 and 8, the sensing, controlling and dispensing portions of a preserving fluid application system are integrated into one assembly indicated by the numeral 160, and hereafter referred to as dispensing units, supported by a manifold assembly 162 extending transversely between the opposite side sheets 16 below the upper run 49 of the bottom conveyor 28 between the forward and rear rollers 38 and 40, respectively, of that conveyor. The lateral disposition of the dispensing units 160 is not shown in the drawings but preferably they would be arranged laterally aligned and evenly spaced across the conveying system 25, for example with a unit between every second pair of belts or even one unit between each pair of belts of the upper run 49 of the bottom conveyor 28.

Figure 8:
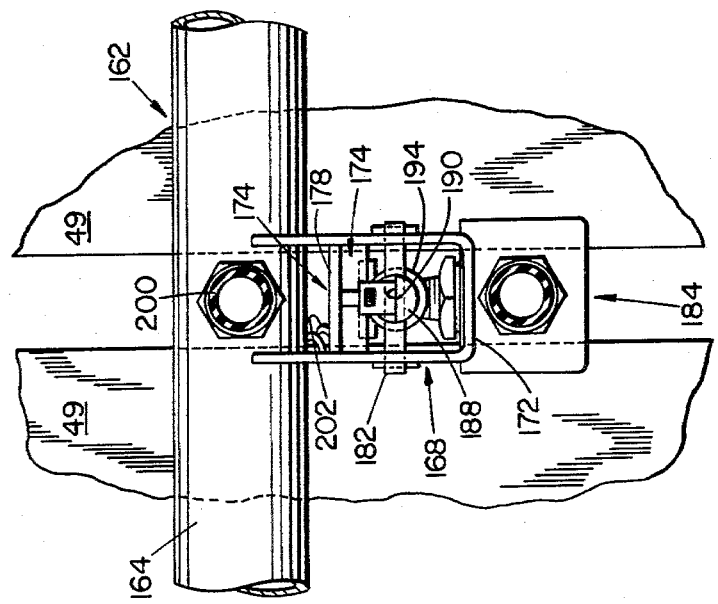
FIG. 8 is a view approximately on line 8—8 of FIG. 7.

The manifold assembly includes a manifold pipe 164 which has a series of rearwardly and downwardly directed outlets 166, one outlet for each dispensing unit 160 as indicated in FIG. 8. Rigidly attached to and extending forwardly and downwardly from the manifold pipe 164 in general alignment with each outlet 166 is a U-shaped pivot bracket 168 having a pair of opposite side portions 170 and a bottom portion 172. Rigidly supported between the opposite side portions 170 is a stop bracket 174 having a forwardly and downwardly extending stop leg 176 and a rearwardly and downwardly extending switch actuator leg 178. What will be referred to as a nozzle assembly 180 is mounted in the manifold bracket 168 for pivoting about a transverse axis (by means of pin 182) and includes an electric solenoid valve 184 and a normally open microswitch 186 having an actuator 187. The microswitch 186 and solenoid valve 184 are conventionally interconnected electrically and also connected to an electrical power source on the towing vehicle (not shown). The nozzle assembly 180 also includes a frame-like portion 188 which is generally cylindrical in form except for a flat portion 190 at its lower end providing a mounting surface for the microswitch 186. It also includes a transverse hole 192 providing a bearing for the pivot pin 182. The nozzle assembly 180 also includes a nozzle pipe 194 threaded onto and rigidly attached to the solid portion 188 carrying a nozzle orifice 196 at its upper end, the joint between pipe 194 and frame portion 188 being provided with a gas-tight seal. As is best seen in FIG. 7, the nozzle pipe 194 extends upwards between the belts in the upper run 49 of the bottom conveyor 28. A combined shield and deflector or pressure plate 198 lies along and is rigidly attached to the rearward upper surface of the nozzle pipe 194 extending slightly beyond the end of that pipe so as to slightly overhang the orifice 196. The width of the deflector plate 198 is slightly greater than the diameter of the nozzle pipe 194 and is of such a width that it also serves as a belt guide for the portion of the upper run 49 of the bottom conveyor immediately alongside it. An electric solenoid valve 184 is mounted in a portion of the nozzle pipe below the upper run 49 of the conveyor belts and is in fluid communication with the inside of the nozzle pipe 194. A hose 200 is provided for conducting fluid between the manifold pipe 164 and the solenoid valve 184. A supply hose 201 connects the manifold pipe 164 to a fluid supply tank (not shown in FIG. 2). In each dispensing unit 160 a helical tension spring 202 is connected between holes provided in the manifold bracket 168 and the deflector plate 198 so as to bias the dispensing assembly 160 in a clockwise direction as viewed in FIG. 7 so that normally, as indicated in the phantom position of FIG. 7, the nozzle assembly 180 is in a "closed" position with the heel of the frame portion 188 bearing against the bottom portion 172 of the manifold bracket 168 and with the microswitch 186 effectively retracted from the switch actuator leg 178 of the stop bracket 174 so that the microswitch actuator 187 can assume its "normally open" position.

In operation, as the machine advances across the field of windrowed or swathed crops, the pickup mechanism 26 raises a crop windrow or swath 204 and moves it rearwardly to the compressor rolls 30 and 38 which deliver the crop rearwardly in a mat to the inlet of the baling zone or chamber 50 where, it being engaged by the rearwardly moving upper run 49 of the lower conveyor 28 and the forwardly moving bale-engaging run 58 of the upper or bale-forming conveyor 54 as indicated in FIG. 1, the oppositely moving belts tend to roll the hay into a cylinder and the stripper roller 66 prevents the upper conveyor from expelling the crop material forwardly over the upper compressor roll 30. As the size of the cylinder of hay in the baling zone 50 increases, the bale is supported from below on the upper run 49 of the lower conveyor while the bale-engaging run 58 of the upper conveyor substantially engages the periphery of the remainder of the bale. The increasing bale size, of course, requires additional length of the bale-engaging run 58 of the upper conveyor and the necessary belt length is provided through upward retraction of the idler rollers 62 made possible by the retractable belt takeup mechanism (not shown in the drawings).

The baler is provided with a gate (not shown in the drawings) extending across the rear of the machine which may be swung rearwardly and upwardly to provide clearance for the rearward discharge of a bale after it has reached a desired size.

As indicated in FIG. 1, the swath 204, having been lifted by the pickup 26, is conveyed across the stripper floor 34 of the pickup towards the compression rolls 30 and 38 and, generally, one or more of the compressor rods 82 will be engaged and deflected upwards by the crop material, pivoting counterclockwise about pivot bracket 80. In typical operation, of course, there is no uniform mat extending across the full width of the conveying system 25 between the opposite side sheets 16 but rather an irregular flow of material resulting from variations in the width of and perhaps gaps in the swath and in the deliberate steering by the operator of the baler so as to direct the flow of material entering the machine to one portion or another of the baling chamber 50 so as to form ultimately a more uniform bale. The sensitivity of the compressor rod assembly 76 in detecting crop material in the conveying system adjacent the compressor rod assembly is enhanced through the additional surface area afforded by the pressure plate 86 carried on the lower portion 84 of the compressor rod 82.

A relatively small upward deflection of the lower portion 84 of the compressor rod rotating the compressor rod counterclockwise about the pivot lugs 80 against the bias of spring 96 retracts the striker 88 allowing the actuator 92 of the normally closed switch 78 to assume its closed position, thus powering the electric solenoid valve 100 and releasing fluid through the hose 112 (the tank valve 110 having been opened in earlier preparation) and dispensing it generally downwardly through the nozzle 104 into the crop material around the nozzle including that in the mat passing immediately beneath and closely adjacent the nozzle.

The operation of the mechanically controlled valve system illustrated in FIG. 5 is similar to that just described, but here counterclockwise deflection of any one of the compressor rod assemblies 76' results in a pull on the associated control link 144 rotating the valve orifice element 141 by means of valve lever 142 so as to open the valve 140 and release fluid through the hose 112' to a nozzle similar to that shown in FIG. 2. The valve 140 is conventional in that increasing rotation of the valve orifice element 141 by means of the lever 142 increases the valve effective orifice opening so that, in this application, flow through the valve is proportional to deflection of the rod 82' which in turn is directly related to the thickness of the portion of crop material mat in contact with the rod and closely related to the actual local flow rate of crop material at a given time.

The dispenser nozzles 104 of the embodiments shown in FIGS. 3 and 5 are spaced somewhat downstream of their corresponding detector or sensor units 70 or 120, respectively, as indicated in FIG. 6, but once received into the conveying system 25 any given portion of crop material travels generally rearwardly and longitudinally through the system and as the dispenser nozzles are longitudinally aligned with their corresponding sensor units fluid is released to a given portion of the crop material mat as it is moved rearward by the conveying system and soon after the presence of that portion has been sensed. Given a generally continuous flow of material into the conveying system, the sensing, control and dispensing system operates essentially to release fluid only where crop material is present with respect to the total width of the conveying system 25. When crop material is no longer adjacent a given sensor or detector unit, the compressor rods 76 or 76' are returned to their undeflected position by springs 96 or 150 so that the valves are closed and flow of fluid to the nozzles is interrupted.

Figure 7:
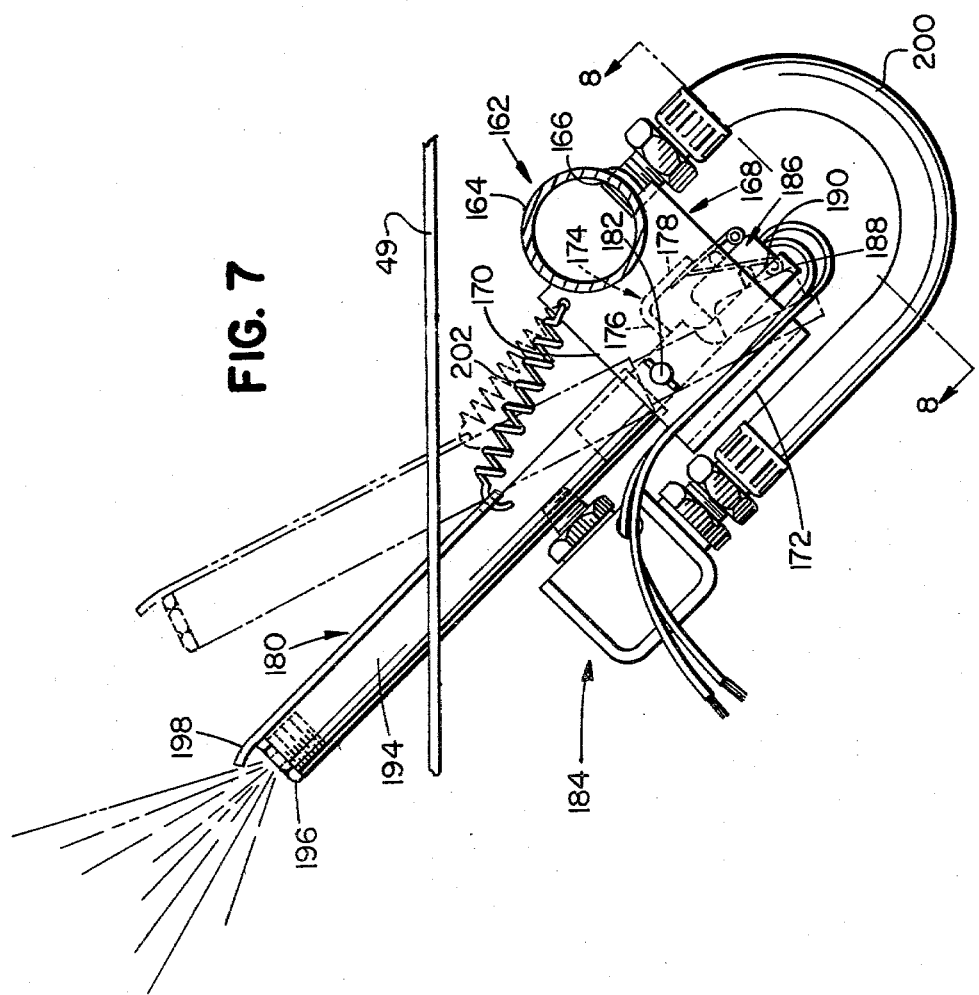
FIG. 7 is a further enlarged partial side elevation view showing more detail of the self-contained, sensing, control and dispensing system of the embodiment of FIG. 2.

In the embodiment of the invention illustrated in FIGS. 2, 7 and 8, the presence of crop material in a given lateral portion of the conveying system is sensed by the deflector plate 198 which, responsive to flow over and against it, is displaced rearward and downward rocking the complete integrated dispensing unit 160 counterclockwise, pivoting about pin 182 so that the actuator 187 of the normally open switch 186 is depressed by contact with the fixed bracket leg 178 closing the switch so that the solenoid valve 184 is powered and opens to release or dispense fluid at the nozzle 196. Deflection of the dispensing unit 160 is limited by provision of the stop leg 176 of the bracket 174 which is engaged by the frame portion 188 as indicated in FIG. 7. It will be seen that, in keeping with the invention, the dispensing unit 160 may be disposed so that it dispenses fluid very close to the pinch point where the incoming mat joins the forming bale so that losses are minimized. The projection of the nozzle assembly 180 above the upper run 49 of the belts should be chosen to suit average crop material mat thickness. A projection of about 75 millimeters when deflected should be satisfactory in most conditions.

It is a feature of the invention, as indicated by the embodiments described here, that crop treating fluid is released closely adjacent a point in the crop material mat where the mat is already substantially confined by a conveying surface, such as the conveyor belts in the upper run 49 of the lower conveyor (FIG. 2), on one side of the mat and by the forming cylindrical bale downstream of and on the opposite side of the mat, close to the tangent point of the incoming mat with the forming bale, so that soon after the application of fluid to a given portion of the mat, that portion is embodied in the bale, thus reducing to a minimum the time in which direct loss to atmosphere of fluid newly applied to the mat can occur. The embodiments described here all use mechanical sensing means—the compressor rod assemblies 76 and 76' (FIGS. 3, 7 and 5, respectively) and deflector plate 198, but it will be obvious that the use of other conventional sensing means such as ultrasonic or photo-electric sensors would be in keeping with the inventions.

We claim:

1. In a mobile machine for forming large cylindrical bales, having a conveying system including a generally fore-and-aft extending conveyor with an upper surface and a bale-forming mechanism for forming cylindrical bales with an axis transverse the conveyor and a forward pickup for lifting crop material from a field and transferring it to the upper surface of the conveyor as a transversely extending mat for rearward movement and delivery to the bale-forming mechanism so that the mat is rolled into a bale by the bale-forming mechanism, the improvement comprising:

a source of crop treating fluid operatively associated with the machine;

fluid dispensing means on the machine, including a plurality of dispenser units independently responsive to the presence of crop material in the mat immediately adjacent the respective dispenser unit for dispensing fluid upwards through the conveyor upper surface over substantially the transverse extent of the mat while it is being carried by the conveyor and immediately before delivery to the bale-forming mechanism;

means for conducting the crop-treating fluid from the source to the dispensing means; and control means operatively associated with the dispenser units for sensing the presence of crop material on the upper surface of the conveyor and controlling the dispenser units so that fluid is dispensed only when material is present on the conveyor.

2. In a mobile machine for forming large cylindrical bales, having a conveying system including a generally fore-and-aft extending conveyor with an upper surface and a bale-forming mechanism for forming cylindrical bales with its axis transverse the conveyor and a forward pickup for lifting crop material from a field and transferring it to the upper surface of the conveyor as a transversely extending mat for rearward movement and delivery to the bale-forming mechanism so that the mat is rolled into a bale by the bale-forming mechanism, the improvement comprising:

a source of crop-treating fluid operatively associated with the machine;

fluid dispensing means on the machine including a plurality of laterally spaced dispenser units, each unit dispensing fluid generally downwards towards the conveyor upper surface over substantially the transverse extent of the mat of crop material while it is carried by the conveyor;

means for conducting the crop-treating fluid from the source to the dispensing means; and control means operatively associated with the dispenser units for sensing the presence of crop material engaged by the conveying system adjacent the pickup and automatically controlling the dispenser units so that fluid is dispensed only when material is present in the conveying system adjacent the pickup.

3. The invention defined in claim 2 wherein the control means includes a plurality of sensors responsive to the presence of crop material adjacent the pickup, each sensor being disposed approximately in longitudinal alignment with a dispensing unit.

4. The invention defined in claim 2 wherein the control means includes a plurality of sensor units and each sensor unit is operatively associated with a dispenser unit and is spaced longitudinally upstream from its associated dispenser unit.

5. The invention defined in claim 2 wherein the control means further includes a crop guide element disposed above the pickup so as to engage crop material being transferred by the pickup to the conveyor and responsive to said engagement so as to actuate the fluid dispensers so that fluid is dispensed only when crop material engages the crop guide elements.

6. The invention defined in claim 2 wherein the control means includes a shut-off valve operable to open and close the conducting means, a compressor rod disposed so as to engage and be deflected by crop material being picked up by the pickup and means connected between the valve and the compressor rod responsive to deflection of the rod for controlling the opening of the valve.

7. The invention defined in claim 6 wherein the control valve is operable to vary flow in the conducting means and wherein the means connected between the valve and the compressor rod includes proportioning means so that an increase in compressor rod deflection causes an increase in fluid flow.

8. The invention defined in claim 6 wherein the shut-off valve is electrically operated and the means connecting the compressor rod to the shut-off valve includes a switch for controlling the valve and responsive to deflection of the compressor rod.

9. In a mobile baler for gathering crop material from a field and including conveying means for transferring it as an incoming mat of material to a baling chamber for rolling into a generally cylindrical bale having an axis transverse the baler and wherein, after initiation of bale formation, the incoming mat is disposed approximately tangentially to the forming bale at the point at which it joins the bale, a dispensing apparatus for applying a treating fluid to the crop material in the baler in a dispensing zone extending transverse of the mat comprising:

a source of crop treating fluid operatively associated with the baler;

dispensing means carried on the baler for directing fluid into the hay in the dispensing zone while the bale is being formed;

means for conducting the fluid from the source to the dispensing means; and means for controlling the release of treating fluid from the dispensing means operatively associated with the conducting means and including means for sensing the presence of crop material in the conveying means, said sensing means spanning the conveying means and being operatively connected to the dispensing means so that fluid is released in laterally spaced portions of the dispensing zone approximately longitudinally aligned with portions of the conveying means in which the presence of crop material has been sensed by the sensing means so that fluid is released only in response to such presence.

10. The invention defined in claim 9 wherein the dispensing means includes a plurality of dispenser units and the sensing means includes a plurality of detectors, both dispenser units and detectors being laterally spaced and substantially spanning the conveying means and wherein each dispenser unit is operatively associated with a particular detector so that release of fluid from each dispenser is responsive to said particular detector.

11. The invention defined in claim 10 wherein each dispenser unit is in longitudinal alignment with its associated detector.

12. The invention defined in claim 11 wherein each dispenser unit is integral with and rigidly connected to its associated detector.

13. The invention defined in claim 11 wherein each dispenser is longitudinally spaced from and downstream of its associated detector.

14. The invention defined in claim 9 wherein the dispenser units are disposed adjacent the tangent point between the forming bale and the incoming mat.

15. The invention defined in claim 9 wherein the dispensing means is longitudinally spaced from and downstream of the sensing means.

16. In a mobile machine for forming crop material into cylindrical bales having an axis transverse the machine including a conveying system having a pickup for picking up crop material from a swath and delivering it rearwardly in a transversely extending incoming mat, a baling chamber having a receiving opening, a conveyor having an upper conveying surface for receiving the mat of crop material from the pickup and conveying it rearwardly to the receiving opening, the width of the mat and its lateral disposition on the conveying surface varying according to the size of the swath and the lateral disposition of the swath in relation to the pickup as the machine advances over the field, an apparatus for applying treating fluid to the crop material comprising:
 a source of fluid operatively associated with the machine;
 means for dispensing the treating fluid over substantially the full width of lower conveyor so as to define a laterally extending dispensing zone;
 means for conducting the fluid from the fluid source to the dispensing means;
 control means operatively associated with the dispensing means and the conducting means and locally responsive to the presence of crop material in laterally spaced portions of the lower conveyor for limiting release of fluid to dispensing zone portions longitudinally aligned with those lower conveyor portions in which crop material is present.

17. The invention defined in claim 16 wherein the dispensing means includes a plurality of dispenser units and the control means includes a plurality of detectors, both dispensers and detectors being laterally spaced and substantially spanning the width of the lower conveyor, each dispenser being operatively associated with one of the detectors so that the release of fluid from each dispenser is controlled independently of the other dispensers.

18. The invention defined in claim 17 wherein at least one dispenser is disposed adjacent the lower conveyor upper surface and directs fluid upwards into the mat being conveyed by that surface.

19. The invention defined in claim 17 wherein each detector includes a sensing means projecting from the upper surface of the lower conveyor engageable and deflectable by the incoming mat deflection of said sensing means actuating the dispenser means to release fluid from the dispenser units.

20. The invention defined in claim 16 wherein the dispensing means includes a plurality of laterally spaced dispenser units, each deflectably mounted and disposed so as to be engaged and deflected by the incoming mat of crop material and the operative association of the control means with the dispensing means includes said dispensing means being actuated by said deflection to release crop treating fluid.

21. The invention defined in claim 20 wherein the dispensing means further includes a generally transverse support carried by the baler and the dispenser units are carried by the transverse support.

22. The invention defined in claim 21 wherein the transverse support comprises a manifold having an inlet communicating with the fluid conducting means and a plurality of outlets, each outlet communicating with one of the dispenser units.

23. The invention defined in claim 20 wherein each dispenser unit includes a nozzle disposed so as to direct treating fluid upwardly into the mat of crop material.

24. The invention defined in claim 16 wherein the control means includes a detector disposed above the pickup for engaging crop material in the conveying system adjacent the pickup and the dispensing means is disposed downstream of the detector.

25. In a mobile machine for forming large cylindrical bales, having a conveying system including a generally fore-and-aft extending conveyor with an upper surface and a bale-forming mechanism for forming cylindrical bales with its axis transverse the conveyor and a forward pickup for lifting crop material from a field and transferring it to the upper surface of the conveyor as a transversely extending mat for rearward movement and delivery to the bale-forming mechanism so that the mat is rolled into a bale by the bale-forming mechanism, the improvement comprising:
 a source of crop treating fluid operatively associated with the machine;
 fluid dispensing means on the machine for applying fluid to the crop material over substantially the transverse extent of the mat while it is engaged by the conveying system and before it is delivered to the bale-forming mechanism;
 means for conducting the crop-treating fluid from the source to the dispensing means; and
 control means operatively associated with the dispensing means for sensing the presence of crop material in engagement with the conveying system and operable to control the dispensing means so that fluid is dispensed only in parts of the conveying system where crop material is present.

26. In a mobile machine for forming crop material into cylindrical bales having an axis transverse the machine and including a conveying system including a pickup for picking up crop material from a swath and delivering it rearwardly in a transversely extending incoming mat, a crop guide disposed above the pickup for controlling the movement of material engaged by the pickup, a baling chamber having a receiving opening, a conveyor having a conveying surface for receiving the mat of crop material from the pickup and conveying it rearwardly to the receiving opening and including a forward conveyor roller and the conveying system including a laterally extending compression roller disposed above the forward conveyor roll, the width of the incoming mat and its lateral disposition on the conveying surface varying according to the size of the swath and the lateral disposition of the swath in relation to the pickup as the machine advances over the field, an apparatus for applying treating fluid to the crop material comprising:
 a source of fluid operatively associated with the machine;
 means for dispensing the fluid into the mat of crop material substantially spanning the conveying system and disposed immediately rearwardly of the compression roll and adapted to release fluid downwardly into the incoming mat;
 means for conducting the fluid from the fluid source to the dispensing means; and
 control means operatively associated with the conducting means for sensing the lateral disposition of the mat and initiating fluid flow only where material is present in the conveying system and interrupting flow when material is not present.

27. The invention defined in claim 26 and further including an elongated transverse member disposed parallel and closely adjacent to the compression roller for scraping extraneous material from the surface of the compression roller and for supporting the dispensing means.

28. In a mobile machine for forming crop material into cylindrical bales having an axis transverse the machine and including a conveying system including a pickup for picking up crop material from a swath and delivering it rearwardly in a transversely extending incoming mat, a crop guide disposed above the pickup for controlling the movement of material engaged by the pickup, a baling chamber having a receiving opening, a conveyor having a conveying surface for receiving the mat of crop material from the pickup and conveying it rearwardly to the receiving opening and including a forward conveyor roller and the conveying system including a laterally extending compression roller disposed above the forward conveyor roll, the width of the incoming mat and its lateral disposition on the conveying surface varying according to the size of the swath and the lateral disposition of the swath in relation to the pickup as the machine advances over the field, an apparatus for applying treating fluid to the crop material comprising:
- a source of fluid operatively associated with the machine;
- means for dispensing the fluid into the mat of crop material substantially spanning the conveying system and including a plurality of dispenser nozzles adjacent the incoming mat of crop material;
- means for conducting the fluid from the fluid source to the dispensing means; and
- control means including valve means operatively associated with the conducting means and detecting means operatively associated with the valve means for detecting the lateral disposition of the mat and initiating fluid flow only where material is present in the conveying system downstream of the detecting means and interrupting flow when material is not present.

29. The invention defined in claim 28 wherein the crop guide is operatively associated with the detecting means.

30. The invention defined in claim 29 wherein the crop guide is deflectable and the detecting means is responsive to deflection of the crop guide.

31. In a mobile machine for forming cylindrical bales of crop material including means for transferring crop material in a mat from the ground to a baling zone in the machine, the baling zone having an inlet, and a bale-forming conveyor having a moving bale-engaging run at least partially spanning the baling zone and engageable with the mat of crop material for rolling the material into a generally cylindrical bale, the improvement comprising:
- a source of crop treating fluid operatively associated with the machine;
- fluid dispensing means on the machine for applying fluid to the crop material in the mat over the transverse extent of the mat while it is being transferred from the ground to the baling zone including a plurality of dispenser units substantially spanning the transferring means;
- means for conducting the crop treating fluid from the source to the dispensing means; and
- control means including sensing means operatively associated with the transferring means, responsive to the presence of crop material in laterally spaced portions of the transferring means so that the applying of fluid is dependent upon the presence of crop material in said spaced portions of the transferring means.

* * * * *